(12) United States Patent
Sugawara et al.

(10) Patent No.: US 7,965,461 B2
(45) Date of Patent: Jun. 21, 2011

(54) INFORMATION REPRODUCING APPARATUS (75) Inventors: Takao Sugawara, Kanagawa-ken (JP);
Jun Lee, Seongnam-si (KR)

(73) Assignee: Samsung Electronics Co., Ltd.,
Suwon-si, Gyeonggi-do (KR)

( * ) Notice: Subject to any disclaimer, the term of this patent is extended or adjusted under 35 U.S.C. 154(b) by 436 days.

(21) Appl. No.: 11/606,030

(22) Filed: Nov. 30, 2006

(65) Prior Publication Data

US 2007/0121232 A1     May 31, 2007

(30) Foreign Application Priority Data

Nov. 30, 2005    (JP) ................................ 2005-346721
Feb. 1, 2006    (KR) ........................ 10-2006-0009815

(51) Int. Cl.
*G11B 20/10*      (2006.01)

(52) U.S. Cl. ....................................................... 360/39

(58) Field of Classification Search ................... 360/39, 360/31, 53
See application file for complete search history.

(56) References Cited

U.S. PATENT DOCUMENTS

| 4,953,041 | A | 8/1990 | Huber |
| 5,901,128 | A | 5/1999 | Hayashi et al. |
| 6,693,863 | B2 * | 2/2004 | Shoji et al. ................. 369/47.35 |
| 6,973,015 | B1 * | 12/2005 | Murakami et al. ......... 369/47.21 |
| 7,142,380 | B2 * | 11/2006 | Ueno .............................. 360/46 |
| 2002/0075584 | A1 * | 6/2002 | Patti et al. ....................... 360/25 |

FOREIGN PATENT DOCUMENTS

| JP | 61289505 | 12/1986 |
| JP | 02302905 | 12/1990 |
| JP | 04028002 | 1/1992 |
| JP | 04286702 | 10/1992 |
| JP | 05-002709 | 1/1993 |
| JP | 05-089551 | 4/1993 |
| JP | 08-263802 | 10/1996 |
| JP | 09320206 | 12/1997 |
| JP | 10-320723 | 12/1998 |
| JP | 11-213313 | 8/1999 |
| JP | 2001060303 | 3/2001 |
| JP | 2001273604 | 10/2001 |
| JP | 2003-109203 | 4/2003 |
| JP | 2003-248905 | 9/2003 |

OTHER PUBLICATIONS

Chinese Office Action dated Dec. 25, 2009; Chinese Patent Application No. 200610064143.4.
U.S. Appl. No. 11/606,074, filed Nov. 30, 2006; Inventor Takao Sugawara et al.; Abandoned Aug. 17, 2009.
Non-Final Office Action dated Feb. 2, 2009; U.S. Appl. No. 11/606,074; Inventor: Takao Sugawara.
Japanese Office Action dated Dec. 14, 2010.

* cited by examiner

*Primary Examiner* — Fred Tzeng
(74) *Attorney, Agent, or Firm* — Volentine & Whitt, PLLC

(57) ABSTRACT

An information reproducing apparatus which reproduces information recorded on a medium includes an asymmetry correction circuit configured to correct an asymmetry of a signal read from a medium. The apparatus also includes a first high pass filter installed before the asymmetry correction circuit and configured to remove noise in the signal by a first cut-off frequency. The apparatus also includes a second high pass filter installed after the asymmetry correction circuit and configured to remove the noise in the signal by a second cut-off frequency, wherein the second cut-off frequency is higher than the first cut-off frequency.

12 Claims, 6 Drawing Sheets

INFORMATION REPRODUCING APPARATUS

BACKGROUND OF THE INVENTION

1. Field of the Invention

The present invention relates generally to an information reproducing apparatus which reproduces information recorded on a recording medium and, more particularly, to an information reproducing apparatus which includes an asymmetry correction circuit.

A claim of priority is made to Japanese Patent Application No. 2005-346721, filed on Nov. 30, 2005, in the Japanese Patent Office, and Korean Patent Application No. 10-2006-0009815, filed on Feb. 1, 2006, in the Korean Intellectual Property Office, the disclosure of which is incorporated herein in its entirety by reference.

2. Description of the Related Art

Hard disk drives (HDDs) are widely used as an information reproducing apparatus for devices such as, for example, computers. Furthermore, HDDs generally use magnetic recording mediums. While conventional HDDs used longitudinal magnetic recording mediums, these days perpendicular magnetic recording mediums are increasingly used in HDDs. The use of magnetic recording mediums will now be described in detail.

In a magnetic recording medium, magnetized information on the medium is detected as a voltage signal that is a vertical component of a magnetic field. This voltage signal is read out by a read head. During the detection, when asymmetry exists in a pH characteristic of the read head, a read signal becomes vertically asymmetric. This vertical asymmetry may increase the bit error rate (BER). In the conventional longitudinal magnetic recording method, the BER is generally compensated for by an asymmetry correction circuit made of a square circuit and an adder. Japanese Patent Publication No. Hei 9-320206 discloses an example of the correction of the BER.

However, the waveform of a read signal in the perpendicular magnetic recording method is different from that in the longitudinal magnetic recording method. Because of the difference between the perpendicular magnetic recording and the longitudinal recording, in the perpendicular magnetic recording method, the read signal is generally demodulated after it is closely approximated to a read signal in a longitudinal magnetic recording method by filtering it with a differential characteristic. However, despite the demodulation, the asymmetry of the read signal cannot be corrected when the filtering is performed prior to applying the signal to the asymmetry correction circuit. This is because of the use of a high pass filter (HPF) in the filtering circuit that is used for removing a low frequency component of the read signal. That is, while correction by the asymmetry correction circuit is possible in the longitudinal magnetic recording method, in the perpendicular magnetic recording method, the asymmetry cannot be corrected due to a higher cut-off frequency of a HPF.

SUMMARY OF THE INVENTION

One aspect of the present disclosure includes an information reproducing apparatus which reproduces information recorded on a medium. The apparatus includes an asymmetry correction circuit configured to correct an asymmetry of a signal read from a medium. The apparatus also includes a first high pass filter installed before the asymmetry correction circuit and configured to remove noise in the signal by a first cut-off frequency. The apparatus also includes a second high pass filter installed after the asymmetry correction circuit and configured to remove the noise in the signal by a second cut-off frequency, wherein the second cut-off frequency is higher than the first cut-off frequency.

Another aspect of the present disclosure includes an information reproducing apparatus which reproduces information recorded on a medium. The apparatus includes an asymmetry correction circuit configured to correct an asymmetry of a signal read from a medium. The apparatus also includes a high pass filter installed in the rear of the asymmetry correction circuit and configured to remove a noise in the signal by a predetermined cut-off frequency.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF EMBODIMENTS

Although, in the following description, a hard disk drive using a perpendicular magnetic recording medium is described as an exemplary embodiment of the disclosed information reproduction apparatus, the present invention is not limited thereto. In the specification and drawings, the same reference numerals are used for the same constituent elements having the same functions so that descriptions about the same elements are omitted.

Figure 1:
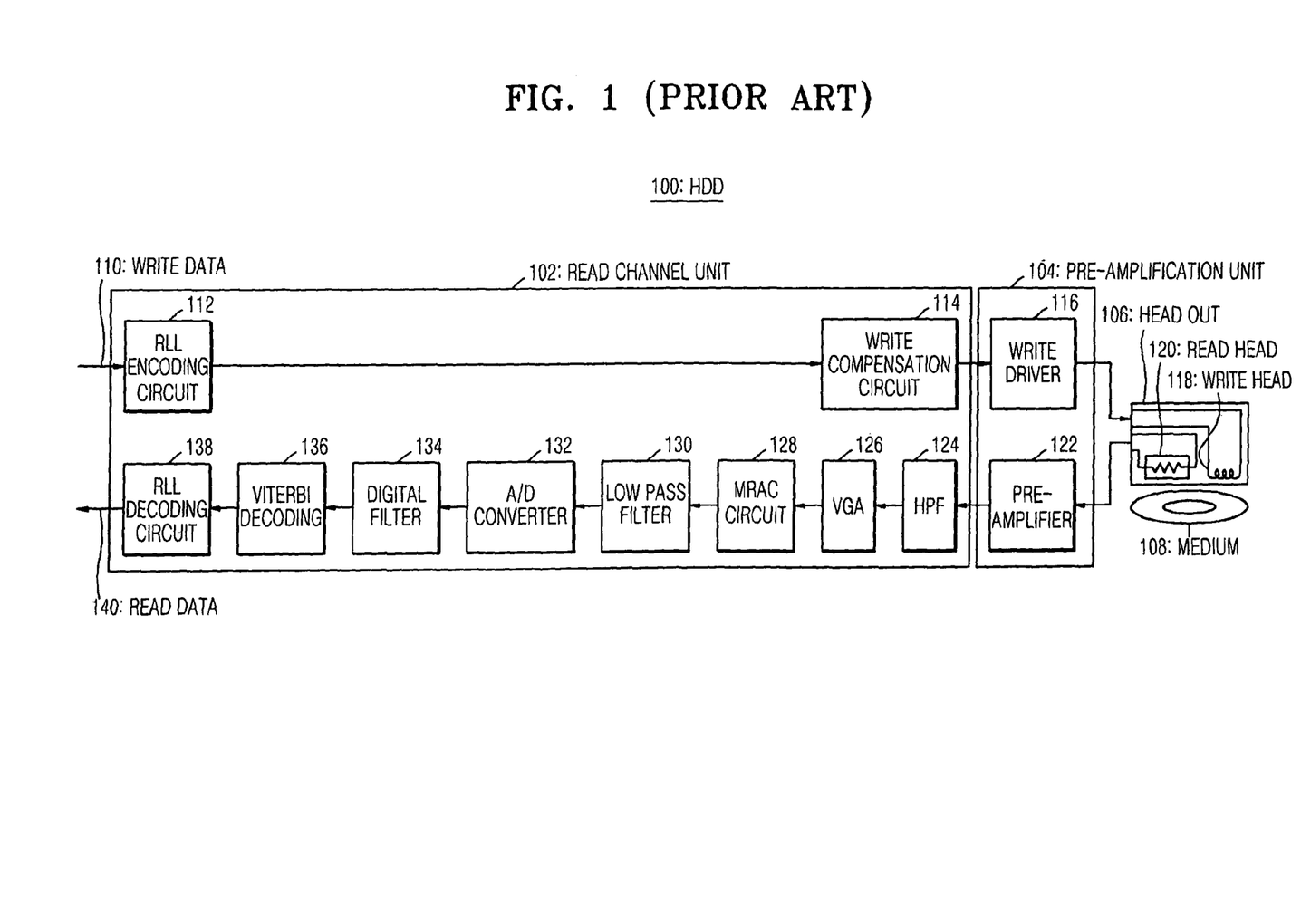
FIG. 1 is a block diagram showing the flow of recording/reproduction of a conventional hard disk drive.

FIG. 1 is a block diagram showing the flow of recording/reproduction of a hard disk drive, in a prior art HDD. Specifically, in FIG. 1, the arrows indicate the flow of information. Referring to FIG. 1, a hard disk drive 100 includes a read channel unit 102, a pre-amplification unit 104, and a head unit 106. The read channel unit 102 and the pre-amplification unit 104 include integrated circuits having various functions which will be described below. The head unit 106 performs recording and reproduction with respect to a medium 108.

During recording, when write data 110 is input to the read channel unit 102, a run length limited (RLL) encoding circuit 112 encodes the write data 110 and a write pre-compensation circuit 114 compensates for the timing of a write pulse. This compensation for the timing of a write pulse is to account, in advance, for the shift of magnetism transition during recording. This shift is referred to as a non-linear transition shift. Furthermore, the write pulse is transmitted to the pre-amplification unit 104. The pre-amplification unit 104 includes a write driver 116 and a pre-amplifier 122. In particular, the write pulse is transferred to the write driver 116 of the pre-amplifier unit 104. Furthermore, the write pulse is converted to write current and transmitted to a write head 118 under the control of the write driver 116. In addition, current flows through a coil of the write head 118 so that information is recorded on the medium 108 by a magnetic field generated by the coil.

During reproduction, a signal read by a read head (or MR head) 120 is amplified by the pre-amplifier 122 and input to a high pass filter (HPF) 124 provided in the read channel unit 102. While the HPF 124 may perform various functions, the main function of the HPF 124 is to remove a DC component (AC coupling) that may cause electrical problems. The HPF 124 is also used to remove thermal asperity (TA) by increasing a cut-off frequency.

At this time, the amplitude of the signal read by the read head 120 is non-uniform and asymmetric. The irregularity in the amplitude is absorbed by a variable gain amplifier (VGA) 126. Furthermore, the asymmetry of the vertical amplitude is corrected by an MR asymmetry correction (MRAC) circuit 128, which will be described in detail with reference to FIG. 2. In addition, noise of a signal whose vertical amplitude asymmetry is corrected by the MRAC circuit 128 is removed by a low pass filter 130. Then, the signal is converted to a digital signal by an analog-to-digital (A/D) converter 132. Moreover, the digital signal is modified into a desired form by a digital filter 134. The read signal includes an encoded bit stream. This encoded bit stream is then decoded by a viterbi decoder 136. Next, the signal is RLL decoded by an RLL decoding circuit 138 and output as read data 140.

Figure 2:
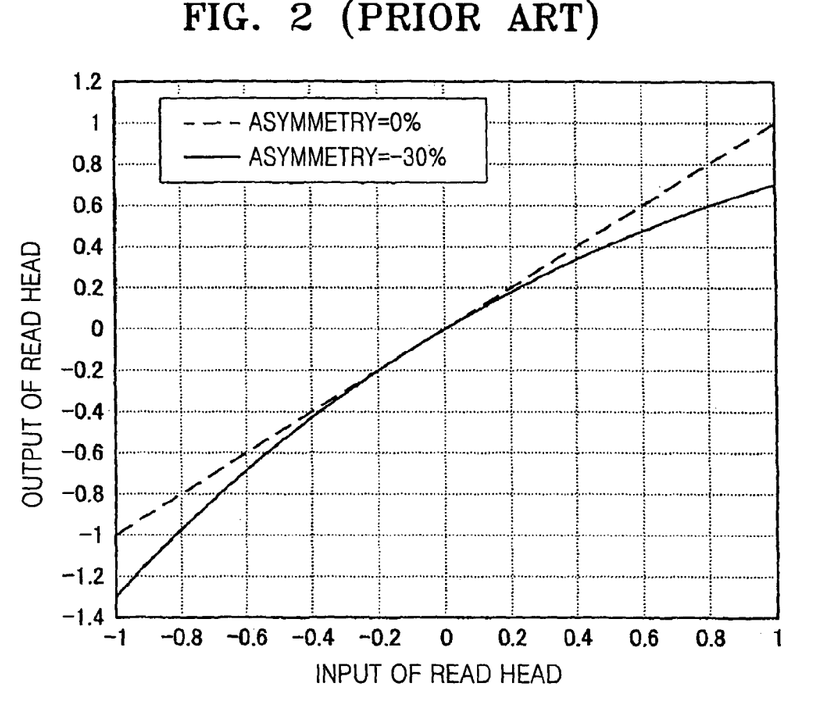
FIG. 2 is a graph showing the input/output characteristic (pH characteristic) of a read head.

FIG. 2 is a graph showing the input/output characteristic (pH characteristic) of a read head. Referring to FIG. 2, the graph shows two different cases: a case in which no asymmetry exists, that is, asymmetry is 0%, which is indicated by a dashed linear line, and the other case in which asymmetry exists to a certain extent, that is, asymmetry is −30%, which is indicated by a solid line. When the asymmetry is −30%, a solid line graph can be approximated as a quadratic function. Specifically, the asymmetry is formed of the quadratic component. The MRAC circuit 128 squares an input signal and removes the quadratic component by adding (or deducting) the squared input signal to (or from) the original input signal, thus correcting the asymmetry.

Figure 3:
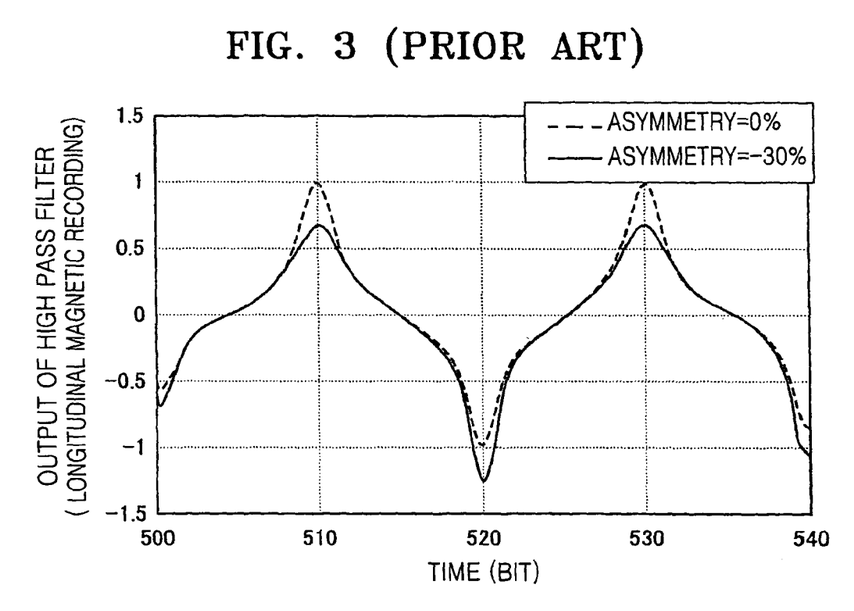
FIG. 3 is a graph showing the output of the read head in a longitudinal magnetic recording method.

FIGS. 3 through 6 are graphs showing the results of comparing the signal waveforms between longitudinal magnetic recording (LMR) and perpendicular magnetic recording (PMR). Specifically, FIG. 3 is a graph showing the output of the read head in a longitudinal magnetic recording method. In FIG. 3, a dashed line indicates a case in which no asymmetry exists while a solid line indicates a case in which the asymmetry is −30%. The difference between these two cases can be compensated for by the squaring operation and an adder as described above.

Figure 4:
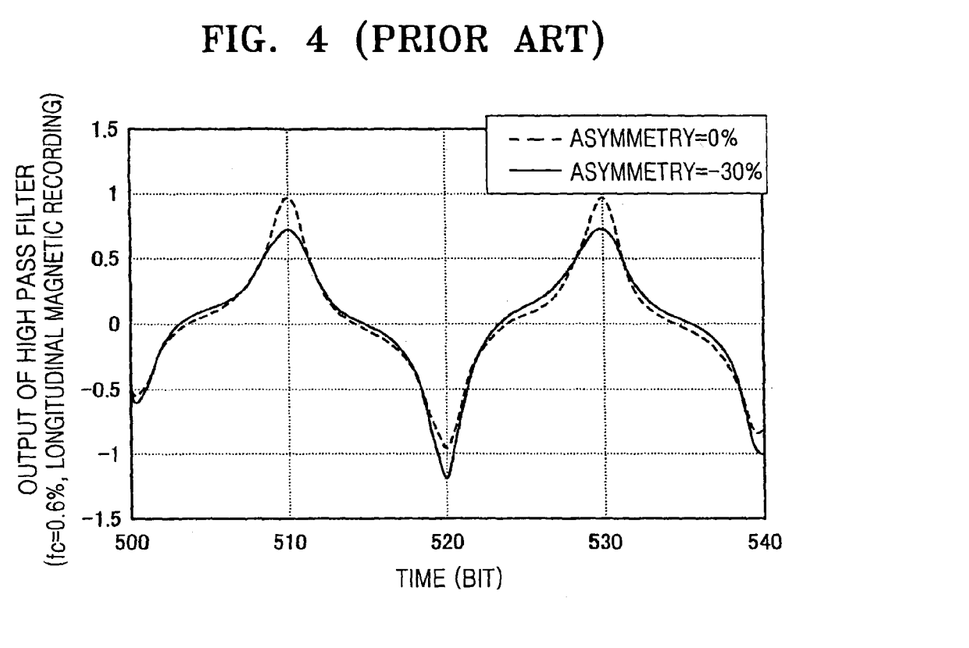
FIG. 4 is a graph showing the output of a high pass filter in the longitudinal magnetic recording method.

FIG. 4 is a graph showing the output of a high pass filter in the longitudinal magnetic recording method. In FIG. 4, a cut-off frequency is set to 0.6% of a clock frequency (the reciprocal of a bit period). The output of the HPF 124 has almost the same shape as the output of the read head 120 and can be sufficiently compensated for by the MRAC circuit 128. In this case, the cut-off frequency of the HPF 124 is set to 0.6% of the clock frequency. However, when the removal of thermal asperity (TA correction) is not performed, the cut-off frequency is generally set to 0.5-1%.

Figure 5:
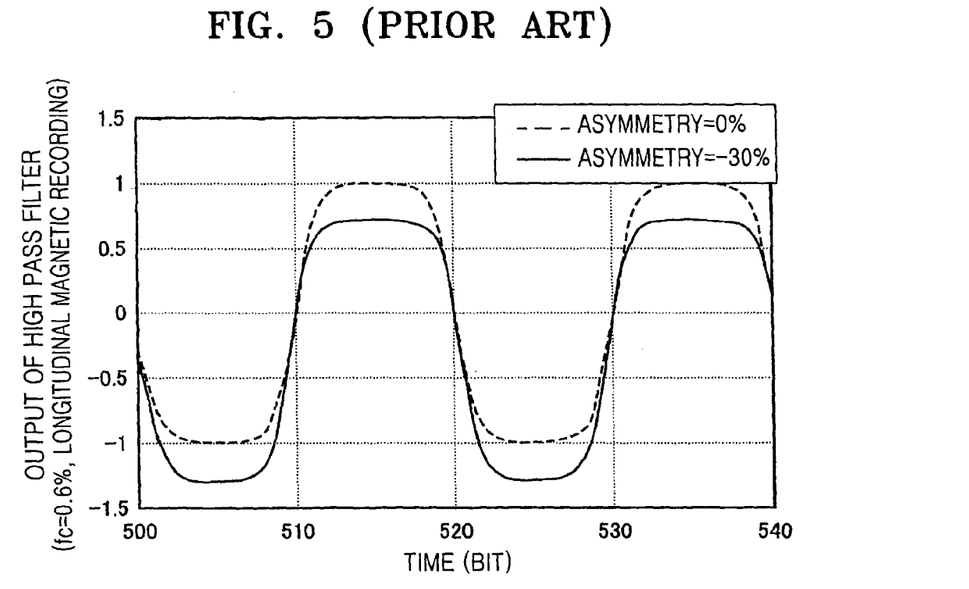
FIG. 5 is a graph showing the output of the read head in a perpendicular magnetic recording method.

FIG. 5 is a graph showing the output of the read head 120 in the perpendicular magnetic recording method. In FIG. 5, a dashed line indicates a case in which no asymmetry exists while a solid line indicates a case in which the asymmetry is −30%. The waveform of the read signal in the perpendicular magnetic recording method is different from that of the read signal in the longitudinal magnetic recording method. Thus, a differentiation process is needed to perform the same type of demodulation performed for the longitudinal magnetic recording method.

Figure 6:
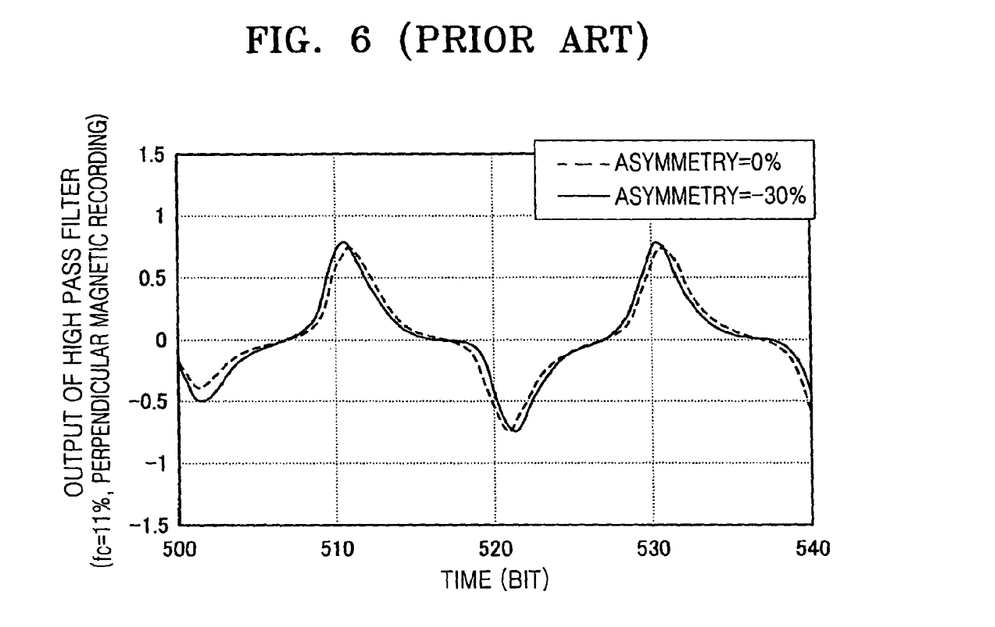
FIG. 6 is a graph showing the output of the high pass filter in the perpendicular magnetic recording method.

FIG. 6 is a graph showing the output of the HPF 124 in the perpendicular magnetic recording method. In FIG. 6, a dashed line indicates a case in which no asymmetry exists while a solid line indicates a case in which the asymmetry is −30%. As shown in FIG. 6, in the perpendicular magnetic recording method, an approximate differential waveform can be easily obtained by increasing the cut-off frequency of the HPF 124. However, because the asymmetry in the amplitude replaces the vertical timing shift (shifting positive peaks forward and a negative peak backward,) the correction of the asymmetry by the conventional MRAC circuit may not be possible anymore.

Figure 7:
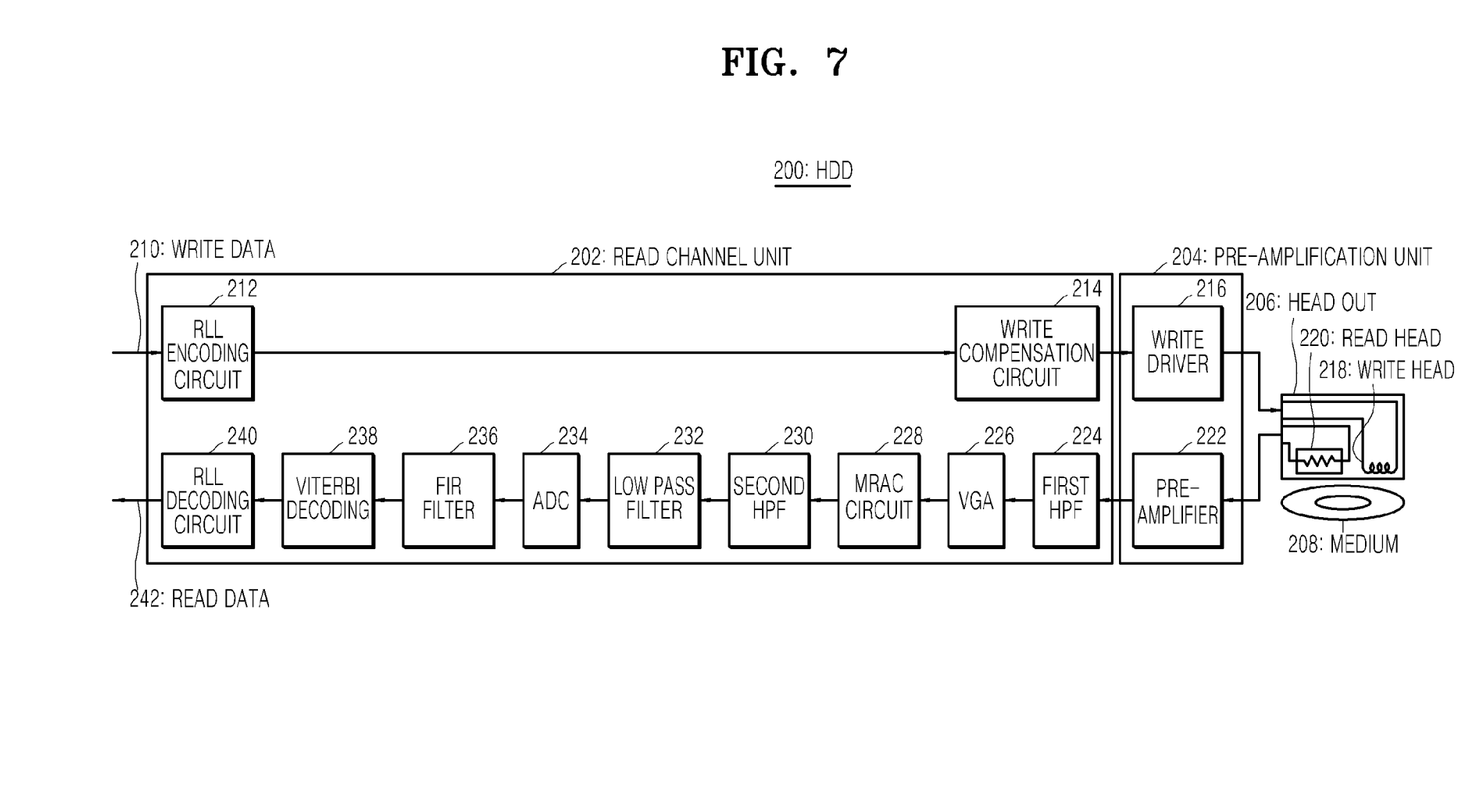
FIG. 7 is a block diagram showing a hard disk drive according to an exemplary disclosed embodiment.

The above-mentioned problem may be solved by the using a structure that may be represented by the block diagram shown in FIG. 7. Referring to FIG. 7, a hard disk drive (HDD) 200 according to an exemplary disclosed embodiment includes a read channel unit 202, a pre-amplification unit 204, and a head unit 206. The read channel unit 202 and the pre-amplification unit 204 include integrated circuits having a variety of functions which will be described later. Furthermore, the read channel unit 202 and the pre-amplification unit 204 can be formed on separate IC chips or on the same IC chip. The head unit 206 performs recording and reproduction with respect to the medium on which the signal is stored. Each of the constituent elements of the HDD 200 will now be described in detail. In particular, this description is based on the circuits of the read channel unit 202 and the pre-amplification unit 204.

A read data 210 is first fed to a run length limited (RLL) encoding circuit 212. The RLL encoding circuit 212 performs encoding of read data 210. In an exemplary embodiment, the RLL encoding circuit 212 is referred to as a zero-consecutive limiting encoding circuit because it limits the length of information "0" of write data 210 for encoding. Then, the write data encoded by the RLL encoding circuit 212 is moved to the read end as a pulse signal (hereinafter, referred to as the write pulse).

A write pre-compensation circuit 214 performs timing correction of the write pulse. That is, the correction of the timing shift of magnetization transition because of the interaction between the write head and the medium occurring during recording. This shift of transition of magnetism is referred to as the non-linear transition shift.

The write pulse corrected by the write pre-amplification circuit 214 is transmitted to a write driver 216 of the pre-amplification unit 204. The write driver 216 converts the write pulse that is a digital signal, to write current that is an electric signal. In an exemplary embodiment, the write driver 216 is referred to as a current drive circuit because of this function.

The write current converted by the write pre-amplification circuit 214 is transmitted to a write head 218. Generally, the write head 218 is formed of a coil. Furthermore, the write current flowing through the coil generates a magnetic field which enables magnetic recording on the medium 208.

The signal read by the read head 220 is amplified by a pre-amplifier 222. Next, the signal amplified by the pre-amplifier 222 is input to a first high pass filter (HPF) 224 installed at the first stage of the read channel unit 202. While the first HPF 224 may perform a variety of functions, the main function of the first HPF 224 is to remove a DC component (AC coupling) that may cause electrical problems. In the following description, for the convenience of explanation, the cut-off frequency of the first HPF 224 is referred to as a first cut-off frequency.

A signal output from the first HPF 224 is fed to a variable gain amplifier (VGA) 226. The VGA 226 performs a function of absorbing the deviation of the amplitude of a signal output from the first HPF 224. Furthermore, an MR asymmetry correction (MRAC) circuit 228 corrects the asymmetry of the vertical amplitude of the signal output from the VGA 226.

A second high pass filter (HPF) 230 performs processing functions associated with the noise signal of the perpendicular magnetic recording method. Moreover, the second HPF 230 generally performs these processing functions close to a differential characteristic of the second HPF 230. Accordingly, the second HPF 230 has a cut-off frequency that is higher than that of the first HPF 224 (the first cut-off frequency). In the following description, for the convenience of explanation, the cut-off frequency of the second HPF 230 is referred to as a second cut-off frequency.

While the second HPF 230 may perform a variety of functions, the main functions of the second HPF 230 include removing thermal asperity (TA) and processing the received signal in a manner suitable for the noise signal of the perpendicular magnetic recording method (generally close to a differential characteristic). The TA is read error that may occur because of the use of the MR head. Specifically, when foreign materials such as a protrusion piece or dust exist on the medium, the MR head collides with them and the resulting collision energy increases the temperature of the device. As a result, the resistance value of the MR head changes. This change in the resistance value of the MR head causes a change in the signal of a magnetic field obtained from the medium to be indistinguishable. Accordingly, the second HPF 230 removes the TA by having an increased cut-off frequency as compared to that of the first HPF 224. In an exemplary embodiment, the second HPF 230 that performs an approximate differential operation is arranged at the rear of the MRAC circuit 228.

The disclosed HDD 200 also includes a low pass filter 232. The low pass filter 232, similar to an analog filter, removes noise. In addition, the low pass filter 232 may also perform a boost function. That is, the low pass filter 232 may also be used to emphasize a signal having a specific function.

The disclosed HDD 200 may also include an analog/digital converter (ADC) 234. The ADC 234 may convert an analog electric signal into a digital pulse signal. In addition, a digital filter (finite impulse response (FIR) filter) 236 modifies the binarized digital signal into a desired form. Furthermore, a Viterbi decoder 238 decodes the digital signal. Moreover, an RLL decoding circuit 240 RLL decodes the signal decoded by the viterbi detector 238 and outputs the signal as read data 242.

The structure shown in FIG. 7 is merely an example of the HDD 200 and one skilled in the art will appreciate that all elements (function blocks) are not necessary. Furthermore, other elements may also be added as desired without departing from the scope of this disclosure.

Figure 8:
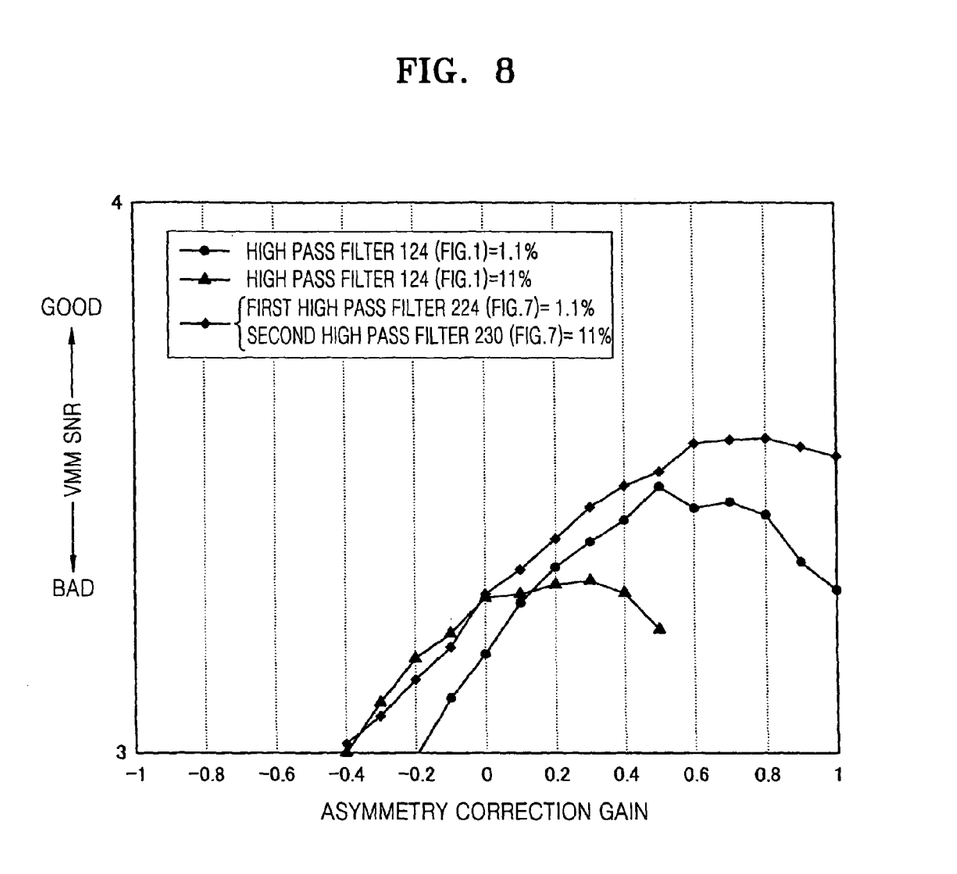
FIG. 8 is a graph showing the influence of a cut-off frequency of the high pass filter on a bit error rate according to an exemplary disclosed embodiment.

FIG. 8 is a graph illustrating the influence of the cut-off frequency of the high pass filter on a bit error rate. In FIG. 8, the vertical axis indicates a parameter (viterbi reliability information) that is an index of a bit error rate (BER). When the cut-off frequency of the HPF 124 is 1.1% of the clock frequency in the structure shown in FIG. 1, the BER is improved as per the conventional asymmetry correction. However, when the cut-off frequency of the HPF 124 is 11% of the clock frequency, the conventional asymmetry correction effect is weak.

In order to alleviate this problem, as shown in the structure of FIG. 7, the first HPF 224 is installed before the MRAC circuit 228 while the second HPF 230 is installed after the MRAC circuit 228. Furthermore, the first cut-off frequency is set at 1.1% of the clock frequency and the second cut-off frequency is set at 11% of the clock frequency. When the first cut-off frequency is 1.1% of the clock frequency and the second cut-off frequency is 11% of the clock frequency, the asymmetry correction effect may be improved. Furthermore, because the waveform equalization by the second HPF 230 is also improved, the most appropriate BER may be expected.

Various changes can be made to the above-described HDD without departing from the scope of the disclosure. For example, although two high pass filters are used in the present embodiment (please refer to FIG. 7), the present invention is not limited thereto. For example, only the second HPF after the MRAC circuit may be used if there is no problem of removing a DC component (AC coupling).

Furthermore, in the structure shown in FIG. 7, the second HPF is installed after the MRAC circuit, but the present invention is not limited thereto. The second HPF may be installed at any position after the MRAC circuit, in particular, between the MRAC circuit and the ADC.

Also, although the HPF can be installed at the pre-amplifier, because the HPF 224 is located before the MRAC circuit, the HPF 224 is regarded as the first HPF. In another exemplary embodiment, when the MRAC circuit is installed at the pre-amplification unit, the same effect can be expected when the cut-off frequency of the HPF after the MRAC circuit is increased as compared to the HPF before the MRAC circuit. In this case, the HPF after the MRAC circuit can be installed at either the pre-amplification unit or the read channel unit.

The disclosed HDD can be used for any information reproducing apparatus that reproduces information recorded on a recording medium. In particular, the disclosed HDD may be used as an information reproducing apparatus using a perpendicular magnetic recording medium. Furthermore, the disclosed HDD can be used in other information reproducing apparatuses in which a read signal has a vertical asymmetry in a rectangular shape as in the perpendicular magnetic recording. In addition, although the disclosed HDD can be used in an apparatus having a reproduction function, the present disclosure is not limited thereto and can be applied to an apparatus capable of recording and reproducing, for example, HDDs.

While this invention has been particularly shown and described with reference to exemplary embodiments thereof, it will be understood by those skilled in the art that various changes in form and details may be made therein without departing from the spirit and scope of the invention as defined by the appended claims.

What is claimed is:

1. An information reproducing apparatus which reproduces information recorded on a medium, the apparatus comprising:
   a first high pass filter configured to remove noise by a first cut-off frequency in a signal read from a medium;
   an asymmetry correction circuit configured to correct an asymmetry of the signal filtered by the first high pass filter; and
   a second high pass filter installed after the asymmetry correction circuit and configured to remove a thermal noise by a second cut-off frequency in the signal corrected by the asymmetry correction circuit, wherein the second cut-off frequency is higher than the first cut-off frequency.

2. The apparatus of claim 1, wherein the asymmetry correction circuit is installed in a pre-amplification unit which amplifies the signal read from the medium.

3. The apparatus of claim 1, wherein the asymmetry correction circuit and the second high pass filter are installed in a pre-amplification unit which amplifies the signal read from the medium.

4. The apparatus of claim 1, wherein the signal read from the medium has a vertical asymmetry in a rectangular shape.

5. The apparatus of claim 1, wherein the thermal noise removed by the second high pass filter comprises thermal asperity noise.

6. An information reproducing apparatus which reproduces information recorded on a medium, the apparatus comprising:
   an asymmetry correction circuit configured to correct an asymmetry of a signal read from a medium and filtered by a first high pass filter; and
   a second high pass filter configured to receive the corrected signal from the asymmetry correction circuit and to remove a noise in the corrected read signal using a predetermined cut-off frequency that is higher than a cut-off frequency of the first high pass filter.

7. The apparatus of claim 6, wherein the asymmetry correction circuit is installed in a pre-amplification unit which amplifies the signal read from the medium.

8. The apparatus of claim 6, wherein the asymmetry correction circuit and the second high pass filter are installed in a pre-amplification unit which amplifies the signal read from the medium.

9. The apparatus of claim 6, wherein the read signal read from the medium has a vertical asymmetry in a rectangular shape.

10. The apparatus of claim 6, wherein the noise removed by the second high pass filter comprises thermal asperity noise.

11. An information reproducing apparatus for retrieving information from a recording medium, the apparatus comprising:
    a first high pass filter configured to receive a signal read from the recording medium by a head unit, the first high pass filter removing a DC component from the read signal using a first cut-off frequency;
    an asymmetry correction circuit configured to receive the signal filtered by the first high pass filter and to correct an asymmetry of the filtered signal; and
    a second high pass filter configured to receive the corrected signal from the asymmetry correction circuit and to remove thermal noise in the corrected signal using a second cut-off frequency higher than the first cut-off frequency.

12. The apparatus of claim 11, wherein the thermal noise removed by the second high pass filter comprises thermal asperity noise.

* * * * *